US010162344B2

United States Patent

Huynh et al.

(10) Patent No.: US 10,162,344 B2
(45) Date of Patent: Dec. 25, 2018

(54) MECHANISM AND APPROACH FOR MONITORING BUILDING AUTOMATION SYSTEMS THROUGH USER DEFINED CONTENT NOTIFICATIONS

(71) Applicant: Honeywell International Inc., Morristown, NJ (US)

(72) Inventors: Cuong Huynh, Renton, WA (US); Stuart Donaldson, Kirkland, WA (US)

(73) Assignee: Honeywell International Inc., Morris Plains, NJ (US)

( * ) Notice: Subject to any disclaimer, the term of this patent is extended or adjusted under 35 U.S.C. 154(b) by 324 days.

(21) Appl. No.: 13/796,308

(22) Filed: Mar. 12, 2013

(65) Prior Publication Data

US 2014/0266671 A1 Sep. 18, 2014

(51) Int. Cl.
*G05B 23/02* (2006.01)
*G05B 15/02* (2006.01)

(52) U.S. Cl.
CPC ......... *G05B 23/0216* (2013.01); *G05B 15/02* (2013.01); *G05B 2219/2642* (2013.01)

(58) Field of Classification Search
CPC .. G08B 21/182; G08B 29/26; G08B 21/0484; G08B 29/24; G08B 31/00; G01N 33/0065; G01D 9/005; G01R 31/2836; G06F 19/3412; G06F 1/3209; H04Q 2213/13163; H04Q 3/0075
See application file for complete search history.

(56) References Cited

U.S. PATENT DOCUMENTS

| | | | | |
|---|---|---|---|---|
| 5,061,916 A | * | 10/1991 | French | G08B 25/08 340/506 |
| 5,611,059 A | * | 3/1997 | Benton | G05B 19/0426 700/17 |
| 5,748,098 A | * | 5/1998 | Grace | 702/181 |
| 6,487,457 B1 | * | 11/2002 | Hull et al. | 700/17 |
| 6,646,564 B1 | * | 11/2003 | Azieres et al. | 340/679 |
| 7,095,321 B2 | * | 8/2006 | Primm et al. | 340/540 |
| 7,962,790 B2 | | 6/2011 | Son et al. | |
| 8,086,352 B1 | * | 12/2011 | Elliott | F24F 11/0009 700/275 |
| 8,099,178 B2 | | 1/2012 | Mairs et al. | |

(Continued)

OTHER PUBLICATIONS http://www.pierpartnershipdemonstrations.org/file_browser/db/CPSLO_ENFORMA_Case_Study_draft01.pdf, "Automated HVAC Fault Detection and Diagnostics," Public Interest Energy Research Program, 4 pages, Feb. 26, 2010.

(Continued)

*Primary Examiner* — Emily C Terrell
(74) *Attorney, Agent, or Firm* — Seager, Tufte & Wickhem LLP

(57) ABSTRACT

A system or mechanism for monitoring a building automation system through configurable conditions that indicate non-optimal performance or failure of building equipment. The mechanism may deliver notifications when the conditions are triggered. The mechanism may enable complex conditions and arbitrary user defined contents providing a context of the system to be delivered as notifications of data to configured recipients. The mechanism may enable a configuring event including not only user defined system context data as part of the event notification but also complex user defined conditions as needed.

21 Claims, 4 Drawing Sheets

(56) References Cited

U.S. PATENT DOCUMENTS

| | | | |
|---|---|---|---|
| 8,224,763 B2 | 7/2012 | Guralnik et al. | |
| 2003/0128114 A1* | 7/2003 | Quigley | G08B 19/005 |
| | | | 340/506 |
| 2008/0059081 A1* | 3/2008 | Gualandri | G05B 23/0283 |
| | | | 702/34 |
| 2010/0228805 A1* | 9/2010 | McCoy | G05B 15/02 |
| | | | 702/187 |
| 2011/0110654 A1 | 1/2011 | Raymond et al. | |
| 2011/0119279 A1* | 5/2011 | Wacker | G01D 1/00 |
| | | | 707/754 |
| 2011/0316688 A1 | 12/2011 | Ranjan et al. | |
| 2012/0011141 A1 | 1/2012 | Park et al. | |
| 2013/0086022 A1* | 4/2013 | Black, III | G11B 27/36 |
| | | | 707/705 |

OTHER PUBLICATIONS http://www.archenergy.com/home, Homepage of Architectural Energy Corporation, 2 pages, dated Sep. 2, 2012.

* cited by examiner

MECHANISM AND APPROACH FOR MONITORING BUILDING AUTOMATION SYSTEMS THROUGH USER DEFINED CONTENT NOTIFICATIONS

BACKGROUND

The present disclosure pertains to monitoring systems and particularly to monitoring building automation systems.

SUMMARY

The disclosure reveals a system or mechanism for monitoring a building automation system through configurable conditions that indicate non-optimal performance or failure of building equipment. The mechanism may deliver notifications when the conditions are triggered. The mechanism may enable complex conditions and arbitrary user defined contents providing a context of the system to be delivered as notifications of data to configured recipients. The mechanism may enable a configuring event including not only user defined system context data as part of the event notification but also complex user defined conditions as needed.

DESCRIPTION

Figure 1:
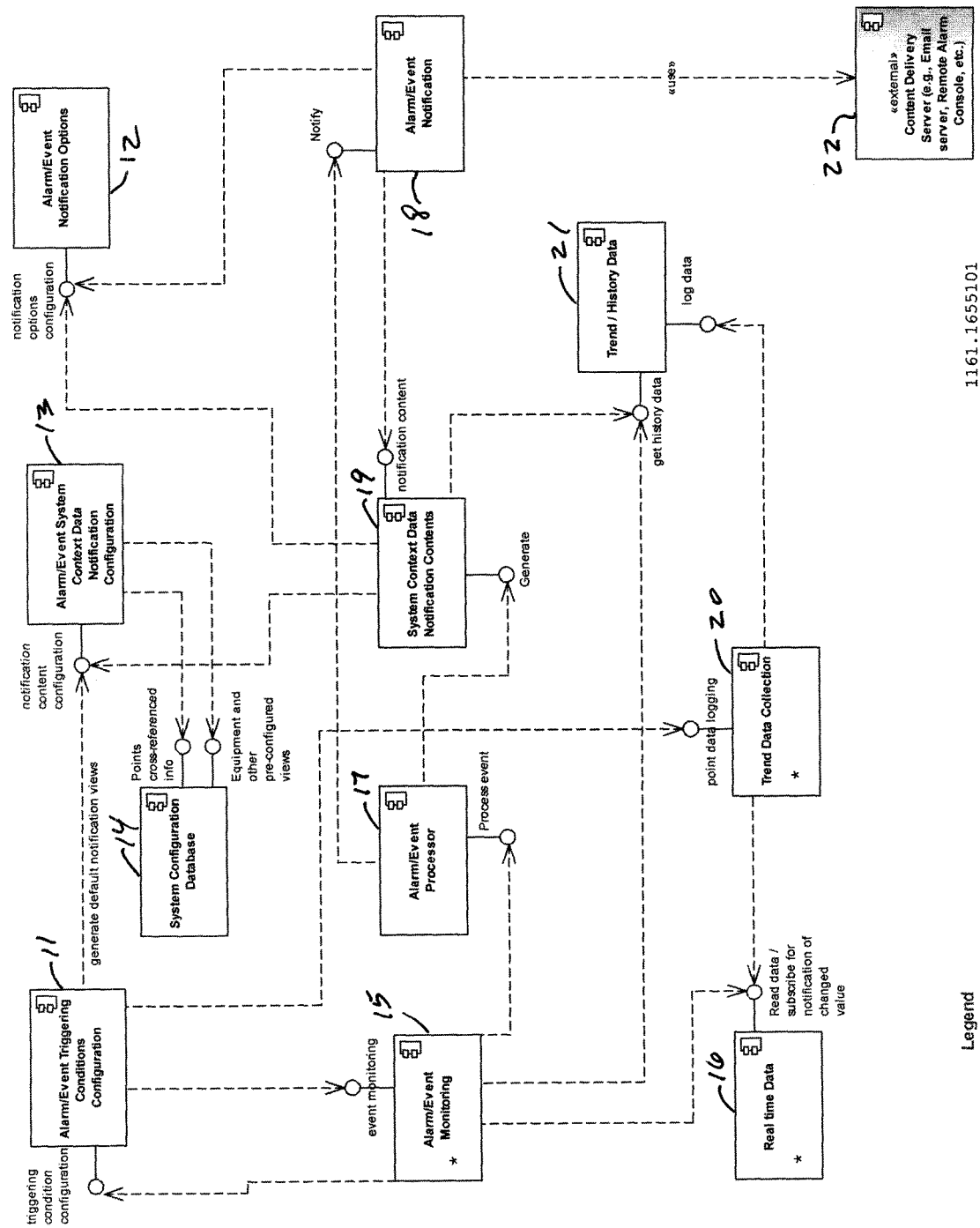
FIG. 1 is a diagram of a mechanism for monitoring a building automation system through user-defined event content notifications.

Users may need a mechanism or system for monitoring a building automation system (BAS) through configurable conditions that detect building equipment failures or non-optimal performance, and enable the system to deliver notifications when those conditions are triggered. Current solutions do not necessarily enable the users to monitor the system efficiently due to limited detection capability and time consuming analysis tasks needed to be followed up from the notifications. Examples of issues may incorporate: 1) User-defined alarms that are limited to configurable parameters of protocol device's simple alarms; and 2) notification contents that are very brief and limited to the state of the triggered event only, and not necessarily the system context that triggers the event to help with analysis and resolution of an issue.

The present system may enable complex conditions and arbitrary user-defined contents providing the context of the system to be delivered as notifications of data to the configured recipients. That is, instead of notifying about only simple event messages from typical alarm notifications, the system may enable a configuring event including not only the user-defined system context data as part of the event notification, but also complex user-defined conditions as needed. System context data could include data such as a specified list of real-time data screen snapshots, reports of specified configuration or temporal/history data, and any configurable contents that can be derived by the system at the time that a notification is processed from the triggered event.

A condition for triggering the notification could be either protocol device's alarm triggering parameters, or a complex user-defined condition based on system current state data as well as history data. This may enable notifications to be used not only for alarm troubleshooting, but also for analytical reporting.

The user-defined notification contents associated with each triggered condition may include virtually all data that the user typically needs for analysis, therefore saving the user time to follow up and search for context information in order to analyze and solve the problem from these notifications.

The present system may be applied in a typical building automation system by providing a user a mechanism to configure triggered conditions and associated notification content, and system components to facilitate complex condition trigger processing as well as user-content data generation. Examples may incorporate the following instances. First, protocol device's alarms may be processed natively by protocol devices' alarm detection mechanism. Second, complex triggered conditions may be processed by a building automation system's server, with a rule-based language that enables a user defining complex conditions based on system's current state data as well as temporal/history data. Third, notification message contents based on user-defined data reporting templates may be generated by a server as result of handling native protocol device's alarms as well as handling a server's feature of complex conditions triggering.

FIG. 1 is a diagram of a system for monitoring BAS through user-defined event content notifications. Several connecting symbols may be utilized in FIG. 1. For instance, where components A and B have a dashed line with an arrow and "o" connection, such as A→o-(service name)-B, "A" may use the specified <service named> provided by "B". A similar connection without the "o", such as A→B, "A" may use one or more services provided by "B".

An alarm/event triggering conditions configuration component 11 may enable configuring alarm/event conditions to be detected and triggered. A triggering condition may be any of the following items. One item may be simple alarm conditions that could be processed by a native building automation system (BAS) controller device. An example may be a condition indicating when an equipment point datum is out of range, or in an unexpected state, or have other similar conditions. Another item may be complex event conditions, which can be expressed as a Boolean expression with many terms, each of which could reference a variable or variables associated with real-time data or a function of real time-data and/or history data. Examples of a complex event condition may incorporate: a) a complex Boolean expression based on current values of real-time data; and b) an expression that references current demand data, and history data as a way to compare demand usage of a site every five minutes or so against another similar site's usage or a goal profile of the site's data, based on similar conditions specified as part of the complex Boolean expression.

An alarm/event notification options component 12 may incorporate a configuration of a notification mechanism such as: a) email; b) a system specific mechanism such as a building automation system's alarm console; or c) another similar notification mechanism, and specific recipients associated with each alarm/event, if applicable.

An alarm/event system context data notification configuration component 13 may enable a configuring of an alarm/event triggering conditions' system context data notification content. This significant component 13 may incorporate data related to a part of the alarm/triggering condition, or other related system context data to help diagnose an alarm/event occurrence, including related data points' current values at the time that the alarm/event triggers, or recent historical data samples relative to the alarm occurrence.

Notification of system context data may be via format that is most suitable to help diagnose alarm/event conditions, for instance, for building automation system's equipment. The format that lends itself for diagnosing the equipment's alarm conditions may be graphic display content configured for the equipment, using specified point data relative to an alarm/event occurrence time, or an "x" unit of time before/after the alarm/event occurrence time, and/or a trend log in tabular or chart format for data points associated with the equipment triggering the alarm and/or other related points. The trend log data may be a derived log based on a user-defined function applied to the original log data and related parameters specified via the functions.

A system configuration database component 14 may enable querying information related to points (such as those referenced in alarm/event triggering condition configuration), and may enable generating a default system context data content notification that includes relevant content based on existing configured views that reference points in the alarm configuration as well as indirect relationships with other related views from a system configuration. For instance, one may consider a point that is space temperature; the system database may have cross-referenced information which enables the database to find and return virtually all existing views including the present point (such as a VAV) and possibly other related views in the system of equipment (e.g., an AHU). This approach may enable a request "generate default notification views" to find applicable views to be used as a default "system data notification". This may make the feature easy to use, in terms of generating default notification content including potentially relevant information, but still allow flexibility through virtually complete customization of the "system context data notification configuration" of component 13.

An alarm/event monitoring component 15 may provide functionality for detecting an alarm/event occurrence. Component or subsystem 15 may periodically poll required data and evaluate each of the user-defined alarm/event triggering conditions configured by the "alarm/event triggering conditions configuration" of component 11. Alternatively, if all of the point data sources in a configured alarm/event triggering conditions support change of value notification, the component or subsystem 15 could subscribe for getting notification whenever any of the data sources in the configured triggered conditions occur and evaluate the result based on notified change of value instead.

If an alarm/event triggering condition evaluates to true, the condition may trigger for further processing. For example, the condition may be routed to an alarm/event processor 17 to generate and send notification content.

Figure 4:
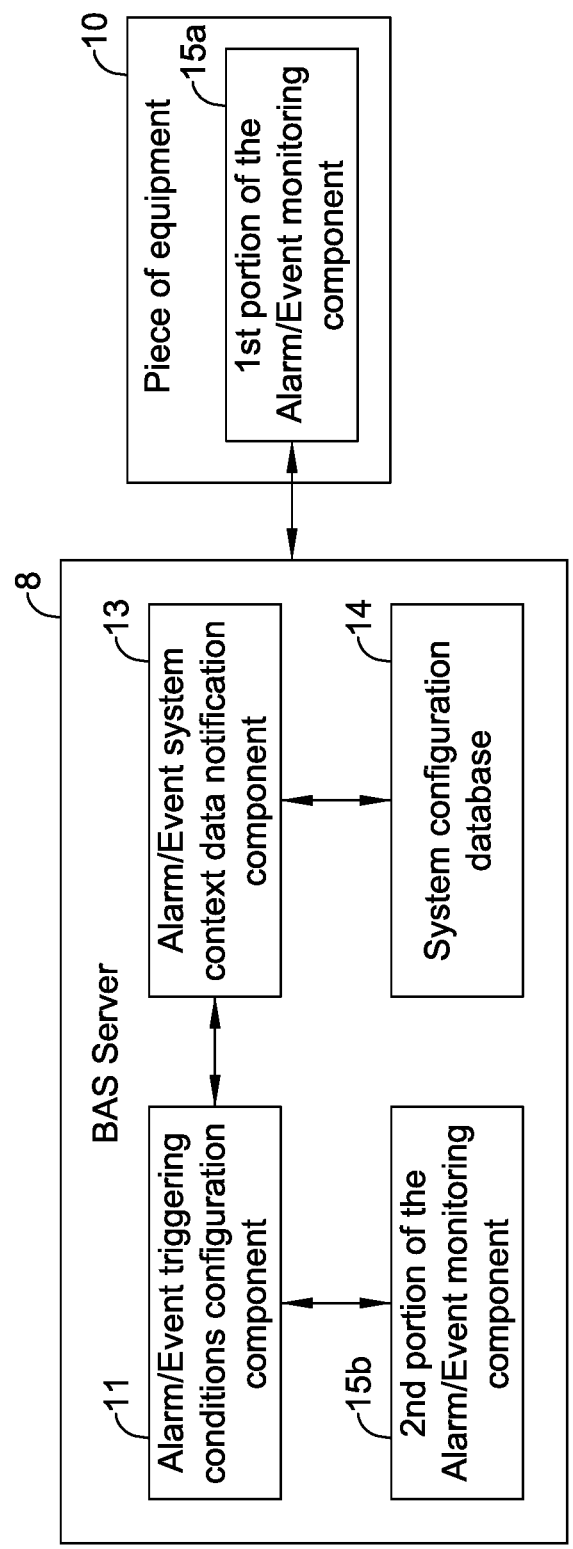
FIG. 4 is a diagram of a mechanism for monitoring a piece of equipment of a building automation system.

For a distributed system, alarm/event monitoring component 15 might be designed as a simple alarm/event monitoring component (e.g., a first portion 15a, as shown for example in FIG. 4) and advanced alarm/event monitoring component (e.g., a second portion 15b, as shown for example in FIG. 4). The simple alarm/event monitoring component may be distributed to monitor an alarm/event in an embedded device (e.g., a piece of equipment 10, as shown for example in FIG. 4) which requires only a basic alarm algorithm detection mechanism based on a current point data value. The advanced alarm/event monitoring components may be allocated to the server (e.g., the building automation system (BAS) server 8, as shown for example in FIG. 4) and require more advanced processing capability including user-defined expressions, possibly with terms referencing a combination of a real-time data variable, and functions that take inputs from either real-time data or history/log data over a time range relative to the event/alarm occurrence time.

A real-time data component 16 may enable other components reading data by either polling or getting notification upon change of values from specified data sources, for example, point data from the building automation system's real-time data.

An alarm/event processor 17 may evaluate a triggered alarm/event's associated configuration and perform further tasks based on that event/alarm configuration. For instance, processor 17 may generate notification content, and route to deliver the content. For completeness, a system such as a building automation system, that provides an approach of delivering user-defined notification content, may likely need to provide other types of configurable actions associated with a triggered event/alarm not related to a notification of content as well. In that case, the alarm/event processor 17 may also handle other actions when applicable.

An alarm/event notification component 18 or subsystem may deliver alarm/event configurable notification content based on a configuration from "alarm/event notification options" component 12.

A system context data notification contents component 19 may provide a service/functionality for generating notification contents configured by "alarm/event system context data notification configuration" component 13. For example, typical contents may include graphics associated with equipment such as an AHU or VAV in a building automation system, displaying system status at time the alarm occurs, or other specified times relative to an alarm occurrence. A relative time may be either before or after an alarm occurrence time. Component 19 may also incorporate related reports, such as a list of one or more trend logs (in tabular or chart) over a historical time range relative to the alarm occurrence time. One may note that, depending on the need of alarm handling, the generated context data notification contents may be persistent, so that they can be subsequently accessed.

A trend data collection component 20 may provide service for collecting trend log data based on, for example, a periodic interval from real-time data sources. Other logging criteria and data sources may also be supported such as whenever data is changed and other type of data sources are available in the system.

A trend/history data component 21 may provide a service for logging and retrieving history data associated with point data needed for an "alarm/event monitoring" of component 15 and an "alarm/event system context data notification configuration" of component 13.

There may be a content delivery server 22. An example of server 22 may incorporate an email server, alarm notification server to alarm console client, and/or so on.

The diagram of FIG. 1 may be described further in terms of connections among the components. Alarm/event triggering conditions configuration component 11 may trigger system context data notification configuration component 13 to generate default notification views. Component 11 may use event monitoring from alarm/event monitoring component 15. Component 11 may also use point data logging from trend data collection component 20.

Alarm/event system context data notification configuration component 13 may use points' cross-referenced information, and equipment and other preconfigured views from system configuration database component 14.

Alarm/event monitoring component 15 may use a triggering condition configuration from component 11, poll data or subscribe for change of value notifications from real time data component 16, history data from trend/history data component 21, and event processing from alarm/event processor 17.

Alarm event processor 17 may use an alarm/event notification from alarm/event notification component 18. Processor 17 may also receive a generation of system context data notification contents from system context data notification contents component 19.

Alarm/event notification component 18 may use notification content from component 19 and notification options configuration from alarm/event notification options component 12.

System context data notification contents component 19 may use a notification content configuration from alarm/event system context data notification configuration component 13, use notification options configuration from component 12 and get history data from trend/history data component 21. Trend data collection component 20 may use poll data or notified change of values from real time data component 16 and log data from component 21.

Alarm/event notification component 18 may use one or more services provided by content delivery server 22. Examples of the one or more services may incorporate those of an email server, remote alarm console, and so forth.

Figure 2:
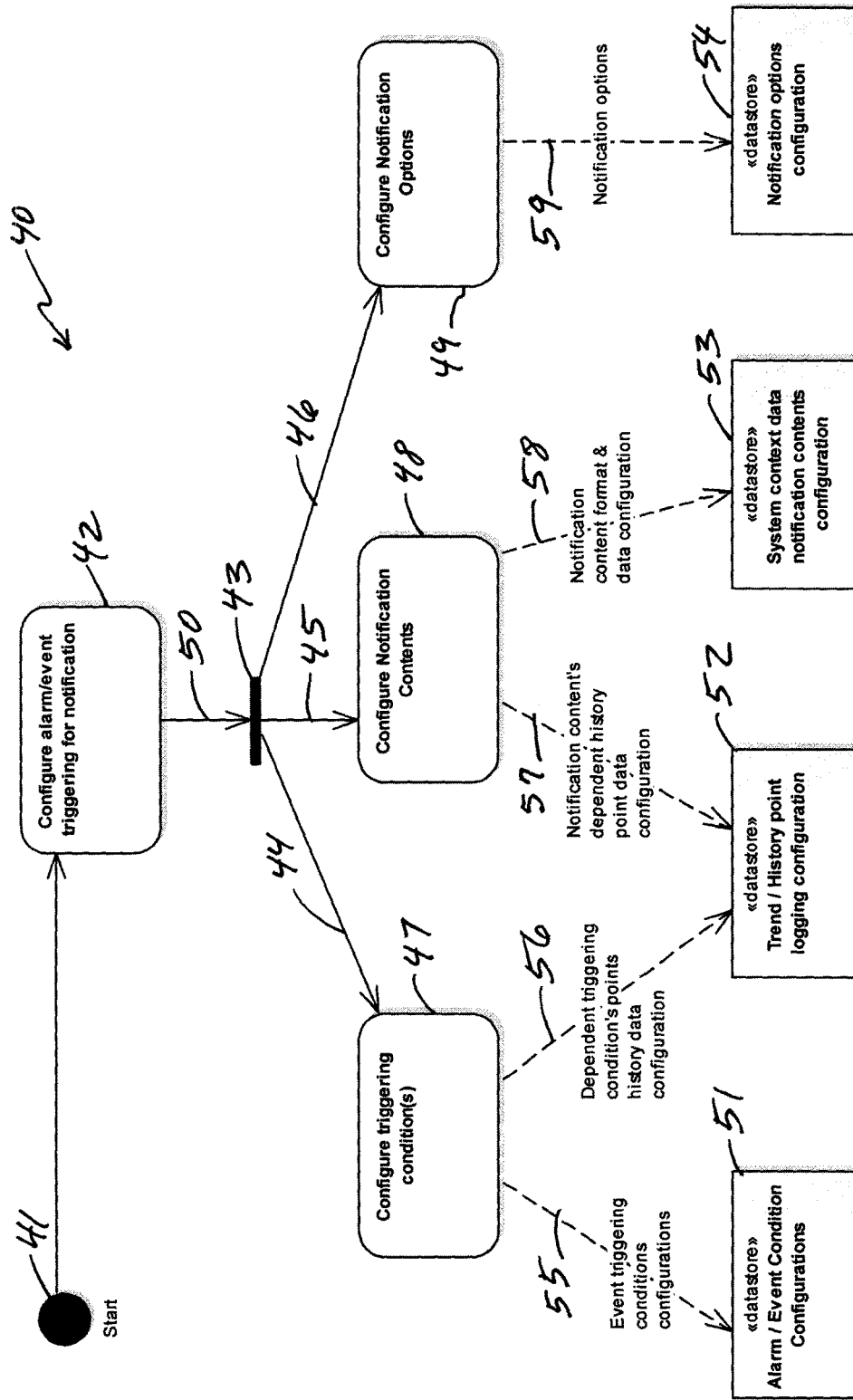
FIG. 2 is an activity diagram of an overall configuration process for a system.

FIG. 2 is an activity diagram of an overall configuration process 40 for the present system. The diagram may reveal a summary of configuration data needed for a "system for monitoring events/alarms and delivery of user-defined notification contents". Several connecting symbols may be utilized in FIG. 2. For instance, where components A and B have a solid line and with an arrow, such as A→B, may indicate a control flow from activity "A" to "B". Where components have a dashed line with an arrow, such as A→B, may indicate activity "A" either reads from or writes to a datastore or service from a subsystem "A".

From a start point 41, a process 42 of configure alarm/event triggering for notification may have a control flow along a line 50 to a point 43 where a control flow along lines 44, 45 and 46 may result in processes 47, 48 and 49, respectively. These processes may occur individually, sequentially or in parallel.

Processes of "configure triggering condition or conditions" 47, "configure notification contents" 48, and "configure notification options" 49 may create configurations as described in the corresponding subsystems in the diagram of FIG. 1 as shown by "alarm/event triggering conditions configuration" component 11, "alarm/event system context data notification configuration" component 13, and "alarm/event notification options" component 12. In addition, there may be trend logs configuration created as result of deriving from the data references in "triggering conditions" and "notification contents".

Also, a default "system context data notification contents configuration" may be suggested to a user based on a relationship of points configured in the "alarm/event condition configuration" and "system configuration database", as illustrated in FIG. 1. An actual configuration may be customized by the user as flexibility to meet a need.

From process 47 along a line 55, event triggering conditions configurations may be either read from or written to a datastore 51 of alarm/event condition configurations. Also from process 47, along a line 56, a dependent triggering condition's points' history data configuration may be either read from or written to a datastore 52 of a trend/history point logging configuration.

From process 48, along a line 57, a notification content's dependent history point data configuration may be either read from or written to datastore 52. Also from process 48, along a line 58, a notification content format and data configuration may be either read from or written to a datastore 53 of system context data notification contents configuration.

From process 49, along a line 59, notification options may be either read from or written to a datastore 54 of a notification options configuration.

Figure 3:
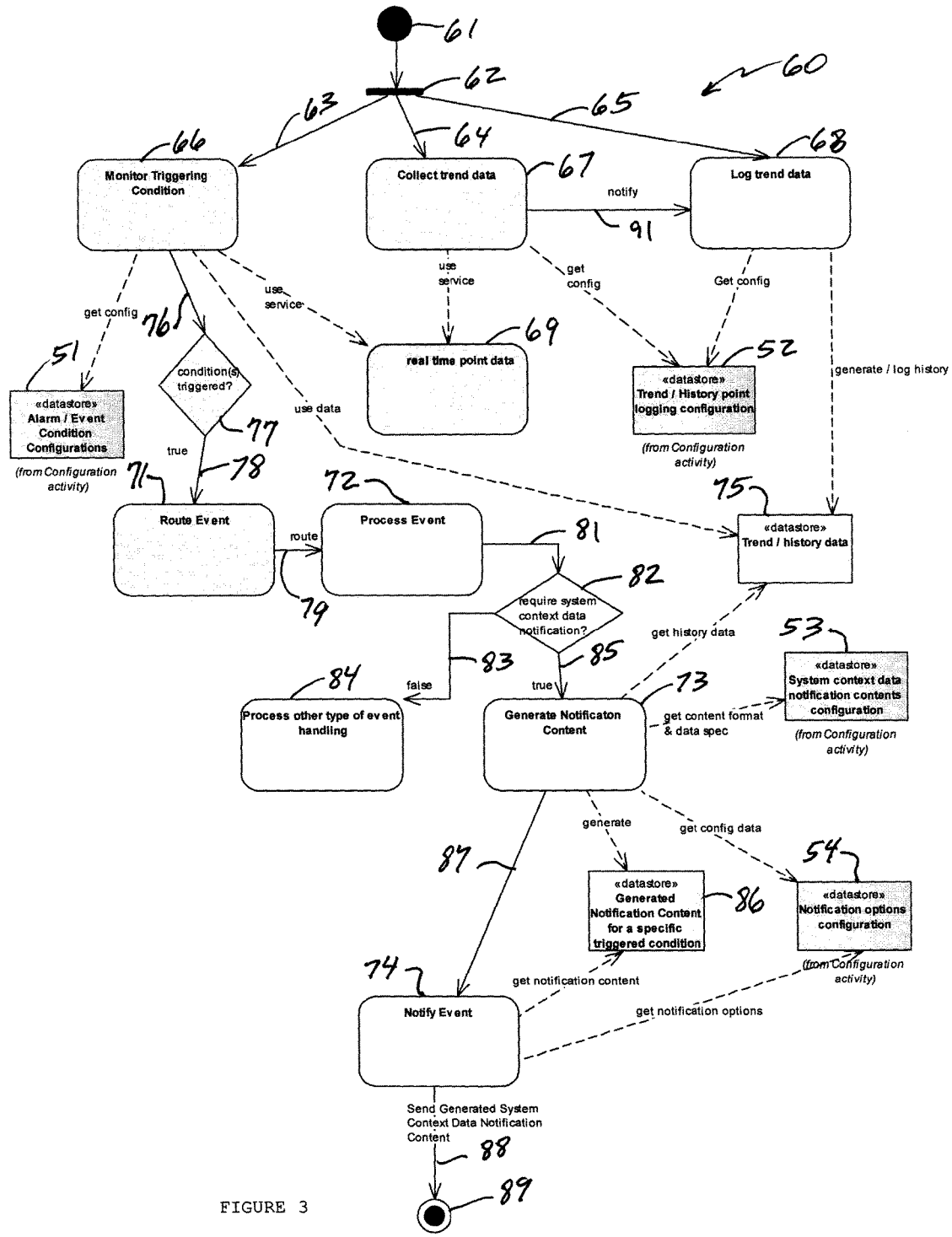
FIG. 3 is a diagram that reveals an event/alarm monitoring and notification process.

FIG. 3 is a diagram 60 that reveals an event/alarm monitoring and notification process. Several connecting symbols may be utilized in FIG. 3. For instance, where components A and B have a solid line and with an arrow, such as A→B, may indicate a control flow from activity "A" to "B". Where components have a dashed line with an arrow, such as A→B, may indicate activity "A" either reads from or writes to a datastore or service "B".

A monitor triggering condition 66 may be based on an alarm/event condition configuration; this process may periodically evaluate the triggering condition from a "alarm/event triggering condition configurations" datastore 51. As part of this process, data may be polled or monitored for change of value and/or history data fetched/analyzed as needed for evaluating the triggering condition. If an advanced triggering condition configuration as indicated by "alarm/event monitoring" component 15 is supported, evaluating it may need a supporting component or components to evaluate an arbitrary expression with term associated with a user defined function and data from a history data source and/or real-time data.

Collect trend data process 67 may poll data or subscribe to get change of value from a data source and buffer collected data. Buffered data may be periodically sent to a "log trend data" process 68 (such as when its buffer is full). The buffered data may also be fetched directly, such as by "log trend data" process 68 when needed.

Log trend data process 68 may log collected data in a system persistence store, in order to support history data references by "monitor triggering condition" and/or "system context data notification content" processes.

A real-time point data process 69 may be a supporting service to provide data for history data logging and/or event/alarm triggering condition evaluations.

A route event process 71 may route a triggered condition to the "process event" process 72 to perform a configurable action on a triggered event.

The process event process 72 may check for action to be performed on the triggered event based on its configuration. For example, if system context data notification content was configured for the triggered event, it may route request it to be processed, such as by a "generate notification content" process 73.

Generate notification content process 73 may be based on the passed triggered event. Process 73 may locate the "notification options configuration" associated with the triggered event. If the notification option configuration exists, process 73 may be scheduled to generate the notification content based on data and a reporting configuration template from a retrieved "notification option configuration" as described in conceptual view's "system context data notification contents" component 19. A schedule to generate either immediately or at a specified later time may depend on the logged data reference in the "notification option configuration", may allow notification content for troubleshooting to include not only the system context data up to the event/alarm occurrence time, but also data in a possibly small period following the event occurrence as referenced in the notification option configuration.

A notify event process 74 may deliver the generated notification content based on the "notification option configuration", which for example may include a list of email recipients to receive this notification. Other alternative recipients may be a client alarm/event console, or a similar type of recipient that could receive complete notification contents to enable analyzing the event without having to connect to a system to look up additional data for analysis.

Diagram 60 may begin the event/alarm activity process at a starting place 61. A control of activity may go to a point 62. A control flow from point 62 may go along line 63 to a monitor triggering activity process 66, along line 64 to a collect trend data process 67, and along line 65 to a log trend data process 68. Processes 66, 67 and 68 may occur individually, sequentially or in parallel.

Activity process 66 may get a configuration from a datastore 51 of alarm/event condition configurations. Monitor triggering condition process 66 may use a service of real time point data process 69. Also process 66 may use data from a trend/history datastore 75. A control flow along line 76 may go from process 66 to a question 77 of whether one or more conditions were triggered. If a response to the question is yes or true, then a control line 78 goes from question 77 to route event activity process 71. The event may be routed along a control line 79 to an activity 72 that processes the event. A processed event may go along a control flow line 81 to a question 82 as to whether a system context data notification is needed. If the answer is no or false, then the event may go along a control flow line 83 to another type of event handling that may be processed at activity 84. If the answer is yes or true, then the event may go along a control flow line 85 to a generate notification content activity process 73. Process 73 may get history data from datastore 75 of trend/history data. Process 73 may get content format and a data specification from datastore 53 of a system context data notification contents configuration. Process 73 may also get configuration data from datastore 54 of a notification options configuration. Process 73 may read from or write to, i.e., generate, notification content for a triggered condition at a datastore 86 of generated notification content for a specific triggered condition. A control flow line 87 may go from generate notification content activity process 73 to notify event activity process 74. Process 74 may get notification content from datastore 86 and get notification options from datastore 54. Along a control line 88 from notify event process 74 to an exit 89, generated system context data notification content may be sent.

Collect trend data process 67 may use a service of real time point data process 69. Process 67 may get a configuration from a datastore 52 of trend/history point logging configuration. Along a control line 91, process 67 may notify log trend data process 68. Process 68 may get a configuration from datastore 52 of a trend/history point logging configuration. Log trend data process 68 may generate/log history for datastore 75 of trend/history data.

Some of the symbols in diagram 60 may be regarded as activity processes, activity processes (optionally distributed to real-time devices), input items and output items. Those noted as activity processes may incorporate items 68, 72, 73, 74, 82 and 84. Those noted as activity processes (optionally distributed to real-time devices) may incorporate items 64, 66, 69, 71 and 77. Items 51, 52, 53 and 54 may be those of an input. Items 75 and 86 may be those of an output.

As discussed above, FIG. 4 is a box diagram of a mechanism for monitoring a piece of equipment of a building automation system. As shown in FIG. 4, the BAS server 8 may include the alarm/event triggering conditions configuration component 11, the alarm/event system context data notification component 13, the system configuration database 14, and the second portion 15b of the alarm/event monitoring component. The piece of equipment 10 may include the first portion 15a of the alarm/event monitoring component.

To recap, a mechanism for monitoring a building automation system may incorporate an alarm/event triggering conditions configuration component, an alarm/event monitoring component, an alarm/event system context data notification configuration component integrated with the alarm/event triggering conditions configuration component and the alarm/event monitoring component to support configuration for data notification, a system configuration database that facilitates generating a default or a user-defined context data notification based on each alarm/event triggering condition configuration, an alarm event monitoring component integrated with the alarm/event triggering conditions configuration component for configuration of alarms/events to monitor, and a real-time data component and a history data component providing data for monitoring alarm/event conditions.

The alarm/event triggering conditions configuration component may obtain generated default notification views from the alarm/event system context data notification configuration component. The alarm/event monitoring component may obtain a triggering condition configuration from the alarm/event triggering conditions configuration component. The alarm/event triggering conditions configuration component may obtain event monitoring from the alarm/event monitoring component.

The mechanism may further incorporate a real-time data component connected to the alarm/event monitoring component, an alarm/event processor connected to the alarm/event monitoring component, an alarm/event notification options component, and an alarm/event notification component connected to the alarm/event notification options component and the alarm/event processor.

The alarm/event monitoring component may obtain poll data or notified change of value from the real-time data component and event processing from the alarm/event processor. The alarm/event processor may obtain a notification from the alarm/event notification component. The alarm/event notification component may obtain a notification options configuration from the alarm/event notification options component.

The mechanism may further incorporate a system context data notification contents component connected to the alarm/event notification options component, the alarm/event system context data notification configuration component, the alarm/event processor and the alarm/event notification component.

The alarm/event processor may obtain a generating of notification content from the system context data notification contents component. The alarm/event notification component may obtain notification content from the system context data notification contents component. The system context data notification contents component may obtain a notification options configuration from the alarm/event notification options component and a notification content configuration from the alarm/event system context data notification configuration component.

The mechanism may further incorporate a trend data collection component connected to the alarm/event triggering conditions configuration component and to the real-time data component, and a trend/history data component connected to the alarm/event monitoring component, the system context data notification contents component, and the trend data collection component.

The alarm/event triggering conditions configuration component may configure point data logging in the trend data collection component, whenever configured triggered conditions need history data. The trend data collection component may obtain data by polling or subscribing to get notified change of value from the real-time data component and log data via the trend/history data component. The alarm/event monitoring component may obtain history data from the trend/history data component. The system context data notification contents component may obtain history data from the trend/history data component.

The mechanism may further incorporate a content delivery server connected to the alarm/event notification component. The alarm/event monitoring component may be distributed to monitor an alarm/event in an embedded device.

An approach for alarm/event monitoring and notification in a building automation system, may incorporate monitoring a triggering condition based on an alarm/event condition configuration, evaluating the triggering condition from an alarm/event triggering condition configuration periodically or upon a change notification of a value in the triggered condition, and polling data, monitoring for change of data values, and/or fetching/analyzing history data as required for evaluating the triggering condition.

If the triggering condition is an advanced triggering condition configuration, then periodically evaluating the triggering condition may require one or more supporting components to evaluate an arbitrary expression with a term associated with a user defined function and data from the fetched/analyzed history data and/or real-time data. The approach may further incorporate collecting trend data, and logging trend data. Collecting trend data may incorporate getting data by polling or subscribing for getting notified change of value from a data source and buffering collected data. Logging trend data may incorporate logging the data into a system persistence store to support history data references.

The approach may further incorporate real-time point data. Real-time data may support services to provide data through polling or subscription for notified change of value for history data logging and/or for evaluating an alarm/event triggering condition.

The approach may further incorporate routing an event, and processing the event. Routing the event may route a triggered condition to the processing the event to perform a configurable action on a triggered event. The processing the event may check for action to be performed on a triggered event based on a configuration of the triggered event.

The approach may further incorporate generating notification content based on a passed triggered event. Generating notification content may locate a notification options configuration associated with the triggered event, if a notification options configuration exists. If a notification options configuration exists, then generating notification content may schedule to generate notification content based on a data and reporting configuration template from a retrieved notification option configuration. To schedule to generate notification content may be either immediately or at a specified later time depending on a logged data reference in the notification option configuration.

To schedule to generate the notification content either immediately or at a specified later time may allow notification content for troubleshooting to include system context data up to an event/alarm occurrence time and also data in a small period following an event occurrence as referenced in the notification option configuration.

The approach may further incorporate notifying the event. The notifying the event may deliver generated notification content, based on the notification option configuration, to one or more recipients. The one or more recipients may receive virtually complete notification contents to enable analyzing the event in absence of connecting to the building automation system to obtain additional data for analyzing the event.

Another approach for configuring alarm/event triggering for notification in a building automation system, may incorporate configuring alarm/event triggering conditions, configuring alarm/event notification contents, and configuring alarm/event notification options. The configuring alarm/event triggering conditions may reference history data. If history data is needed, the history data may be configured automatically as a result of configuring alarm/event triggering conditions. The configuring alarm/event notification contents may incorporate history data. If history data is needed for notification contents, the history data may be configured automatically as a result of detecting history data as needed in the configured notification contents.

The configuring notification contents may have a format and data configurations. Configuring the notification contents may result in a building automation context data notification contents configuration.

The following patent documents may be related to the present disclosure. U.S. patent application Ser. No. 12/840,636, filed Jul. 21, 2010, and entitled "High Volume Alarm Management System", is hereby incorporated by reference. U.S. patent application Ser. No. 12/822,997, filed Jun. 24, 2010, and entitled "Alarm Management System Having an Escalation Strategy", is hereby incorporated by reference. U.S. Pat. No. 8,224,763, issued Jul. 17, 2012, and entitled "Signal Management System for Building Systems", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for monitoring a building automation system, comprising:
   an alarm/event triggering conditions configuration component;
   a system configuration database;
   an alarm/event system context data notification configuration component on a server is integrated with the alarm/event triggering conditions configuration component and system configuration database supporting configurations for data notification;
   the system configuration database facilitates generating a default or a user-defined context data notification based on each alarm/event triggering condition configuration, wherein the context data notification includes content indicating a cause of the triggered alarm/event comprising a trend log for a piece of equipment triggering the alarm/event and a trend log for equipment other than the piece of equipment triggering the alarm/event;

an alarm/event monitoring component integrated with the alarm/event triggering conditions configuration component, the alarm/event monitoring component having a first portion implemented in the piece of equipment and the first portion implemented at the piece of equipment monitors and evaluates an alarm/event condition based on current point data for the piece of equipment and a second portion implemented on the server and configured to process data over a time range relative to an event/alarm occurrence identified by the first portion of the alarm/event monitoring component; and a real-time data component and a history data component, providing data for monitoring alarm/event conditions; and wherein:

using event monitoring from the alarm/event monitoring component, the alarm/event system context data notification configuration component generates the default context data notifications in response to being triggered by the alarm event triggering conditions component, the generated default context data notifications include the trend log for the piece of equipment triggering the alarm/event and the trend log for equipment other than the piece of equipment triggering the alarm/event.

2. The mechanism of claim 1, wherein:
the alarm/event triggering conditions configuration component obtains the generated default notification views from the alarm/event system context data notification configuration component;
the alarm/event monitoring component obtains a triggering condition configuration from the alarm/event triggering conditions configuration component; and
the alarm/event triggering conditions configuration component obtains event monitoring from the alarm/event monitoring component.

3. The mechanism of claim 1, further comprising:
the real-time data component is connected to the alarm/event monitoring component;
an alarm/event processor connected to the alarm/event monitoring component;
an alarm/event notification options component; and
an alarm/event notification component connected to the alarm/event notification options component and the alarm/event processor.

4. The mechanism of claim 3, wherein:
the alarm/event monitoring component obtains data from the real-time data component and event processing from the alarm/event processor;
the alarm/event processor obtains a notification from the alarm/event notification component; and
the alarm/event notification component obtains a notification options configuration from the alarm/event notification options component.

5. The mechanism of claim 3, further comprising a system context data notification contents component connected to the alarm/event notification options component, the alarm/event system context data notification configuration component, the alarm/event processor and the alarm/event notification component.

6. The mechanism of claim 5, wherein:
the alarm/event processor obtains a generating of notification content from the system context data notification contents component;
the alarm/event notification component obtains notification content from the system context data notification contents component; and
the system context data notification contents component obtains a notification options configuration from the alarm/event notification options component and a notification content configuration from the alarm/event system context data notification configuration component.

7. The mechanism of claim 5, further comprising:
a trend data collection component connected to the alarm/event triggering conditions configuration component and to the real-time data component; and
a trend/history data component connected to the alarm/event monitoring component, the system context data notification contents component, and the trend data collection component.

8. The mechanism of claim 7, wherein:
the alarm/event triggering conditions configuration component configures point data logging in the trend data collection component, whenever configured triggered conditions need history data;
the trend data collection component obtains data from the real-time data component and log data via the trend/history data component;
the alarm/event monitoring component obtains history data from the trend/history data component; and
the system context data notification contents component obtains history data from the trend/history data component.

9. The mechanism of claim 7, further comprising a content delivery server connected to the alarm/event notification component.

10. A method for alarm/event monitoring and notification in a building automation system including a piece of building equipment, comprising:
at a piece of building equipment, monitoring a triggering condition based on an alarm/event condition configuration;
at the piece of building equipment, evaluating the triggering condition from an alarm/event triggering condition configuration periodically or upon a change notification of a value in the triggered condition;
in response to identifying an event/alarm occurrence at the piece of building equipment, polling data, monitoring for change of data values, and/or fetching/analyzing history data as required for evaluating the triggering condition at a server; and
notifying with a notification in response to determining at the server that the trigger condition exceeds the alarm/event triggering condition, wherein the notification includes content directly related to the triggering condition exceeding the alarm/event triggering condition comprising trend log data for the piece of building equipment with the trigger condition exceeding the alarm/event triggering condition and data content related to the operation of the building automation system that is indirectly related to the trigger condition exceeding the alarm/event triggering condition comprising trend log data for equipment other than the piece of building equipment with the trigger condition exceeding the alarm/event triggering condition.

11. The method of claim 10, wherein if the triggering condition is an advanced triggering condition configuration, then periodically evaluating the triggering condition requires one or more supporting components to evaluate an arbitrary expression with a term associated with a user defined function and data from the fetched/analyzed history data and/or real-time data.

12. The method of claim 10, further comprising:
collecting trend data; and
logging trend data; and
wherein:
collecting trend data comprises polling data or monitoring change of value from a data source and buffering collected data; and
logging trend data comprising logging the data into a system persistence store to support history data references.

13. The method of claim 12, further comprising:
polling or monitoring real-time point data; and
wherein real-time data supports a service to provide data for history data logging and/or for evaluating an alarm/event triggering condition.

14. The method of claim 13, further comprising:
routing an event; and
processing the event; and
wherein:
routing the event routes a triggered condition to the processing the event to perform a configurable action on a triggered event; and
the processing the event checks for action to be performed on a triggered event based on a configuration of the triggered event.

15. The method of claim 14, further comprising:
generating notification content based on a past triggered event; and
wherein generating notification content locates a notification options configuration associated with the triggered event, if a notification options configuration exists.

16. The method of claim 15, wherein:
if a notification options configuration exists, then generating notification content would schedule to generate notification content based on a data and reporting configuration template from a retrieved notification option configuration; and
to schedule to generate notification content would be either immediately or at a specified later time depending on a logged data reference in the notification option configuration.

17. The method of claim 16, wherein to schedule to generate the notification content either immediately or at a specified later time would allow notification content for troubleshooting to include system context data up to an event/alarm occurrence time and also data in a small period following an event occurrence as referenced in the notification option configuration.

18. The method of claim 17, further comprising:
notifying the event; and
wherein:
the notifying the event delivers generated notification content, based on the notification option configuration, to one or more recipients; and
the one or more recipients can receive virtually complete notification contents to enable analyzing the event in absence of connecting to the building automation system to obtain additional data for analyzing the event.

19. A method for configuring alarm/event triggering for notification in a building automation system including a piece of building equipment, comprising:
configuring alarm/event triggering conditions and distributing the alarm/event triggering conditions to a piece of building equipment;
configuring alarm/event notification contents, wherein the alarm/event notification is generated and issued in response to identifying at the piece of building equipment a triggering condition exceeding an alarm/event triggering condition; and
configuring alarm/event notification options; and
wherein:
the configuring alarm/event triggering conditions references history data and the history data is configured automatically as a result of configuring alarm/event triggering conditions; and
the configuring alarm/event notification contents incorporates history data configured automatically at a server as a result of detecting the triggering condition exceeds the alarm/event triggering condition and include trend log data for the piece of building equipment with the triggering condition exceeding the alarm/event triggering condition.

20. The method of claim 19, wherein the configuring notification contents have a format and data configurations.

21. The method of claim 20, wherein configuring the notification contents results in a building automation context data notification contents configuration.

* * * * *